United States Patent
Henshaw et al.

(10) Patent No.: US 11,319,072 B2
(45) Date of Patent: May 3, 2022

(54) BUSINESS CLASS TRAVEL SUITE ARRANGEMENTS FOR NARROW BODY AND WIDE BODY AIRCRAFT

(71) Applicant: B/E Aerospace, Inc., Winston-Salem, NC (US)

(72) Inventors: Robert J. Henshaw, Newnan, GA (US); Edward W. Morgan, Pfafftown, NC (US); Horng Jaan Lin, Winston-Salem, NC (US); Tracy N. Pence, King, NC (US); Benjamin T. Bailey, Clarkston, GA (US); Jae Hun Gu, Doraville, GA (US); Robert D. Wilkey, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 396 days.

(21) Appl. No.: 16/371,759

(22) Filed: Apr. 1, 2019

(65) Prior Publication Data

US 2020/0307797 A1     Oct. 1, 2020

(51) Int. Cl.
*B64D 11/06*     (2006.01)

(52) U.S. Cl.
CPC ...... *B64D 11/0601* (2014.12); *B64D 11/0606* (2014.12)

(58) Field of Classification Search
CPC ............ B64D 11/0601; B64D 11/0606; B64D 11/0605; B64D 11/0641; B64D 11/0643; B64D 11/0604
See application file for complete search history.

(56) References Cited

U.S. PATENT DOCUMENTS

| | | | | |
|---|---|---|---|---|
| 6,000,659 A | * | 12/1999 | Brauer | B64D 11/0641 244/118.6 |
| 7,178,871 B1 | * | 2/2007 | Round | B64D 11/0606 297/244 |
| 7,419,214 B2 | * | 9/2008 | Plant | B64D 11/0606 297/245 |

(Continued)

FOREIGN PATENT DOCUMENTS

| | | |
|---|---|---|
| EP | 2313315 B1 | 2/2016 |
| EP | 3263458 A1 | 1/2018 |

(Continued)

OTHER PUBLICATIONS

Extended Search Report for European Application No. 19216123.0 dated Jul. 20, 2020, 7 pages.

*Primary Examiner* — Medhat Badawi
(74) *Attorney, Agent, or Firm* — Suiter Swantz pc llo

(57) ABSTRACT

A travel suite arrangement for an aircraft cabin, such as a business class cabin, including at least one longitudinal aisle dividing sections, with each section including at least one four-suite unit. Each four-suite unit generally includes an angled first seat positioned directly adjacent the longitudinal aisle forward-facing, a second angled seat positioned directly adjacent the longitudinal aisle rearward-facing, a third angled seat positioned apart from the longitudinal aisle, to one side of the first seat and rearward-facing, and a fourth angled seat positioned apart from the longitudinal aisle, to one side of the second seat and forward-facing. Aisle seats are accessed directly from the aisle while outboard seats share access passageways.

16 Claims, 14 Drawing Sheets

(56) References Cited

U.S. PATENT DOCUMENTS

| | | | |
|---|---|---|---|
| 7,578,470 B2* | 8/2009 | Plant | B64D 11/0606 244/118.6 |
| 8,196,864 B2* | 6/2012 | Ruiter | B64D 11/06 244/118.6 |
| 8,245,970 B2* | 8/2012 | Harcup | B64D 11/0601 244/118.6 |
| 8,348,195 B2* | 1/2013 | Ersan | B64D 11/06 244/118.6 |
| 8,690,254 B2* | 4/2014 | Cailleteau | B64D 11/0646 297/411.36 |
| 9,126,689 B2* | 9/2015 | Porter | B60N 3/004 |
| 9,302,774 B2 | 4/2016 | Henshaw | |
| 10,246,192 B1* | 4/2019 | Prasad | A47B 81/064 |
| 2002/0070314 A1* | 6/2002 | Schmidt-Schaeffer | B64D 11/064 244/118.6 |
| 2003/0085597 A1* | 5/2003 | Ludeke | B64D 11/0644 297/184.14 |
| 2003/0218095 A1* | 11/2003 | Saint | B64D 11/00 244/118.5 |
| 2004/0195451 A1* | 10/2004 | Bentley | B64D 11/0604 244/118.6 |
| 2004/0227034 A1* | 11/2004 | Wentland | B64D 11/02 244/119 |
| 2004/0232283 A1* | 11/2004 | Ferry | B60N 2/309 244/118.6 |
| 2005/0001098 A1* | 1/2005 | Saint-Jalmes | B64D 11/00 244/118.6 |
| 2005/0011992 A1* | 1/2005 | Ueng | B64D 11/00 244/118.5 |
| 2005/0067870 A1* | 3/2005 | Rezag | B64D 11/064 297/354.13 |
| 2005/0189451 A1* | 9/2005 | Mercier | B64D 11/0601 244/118.6 |
| 2005/0189804 A1* | 9/2005 | Mercier | B64D 11/0606 297/232 |
| 2007/0102577 A1* | 5/2007 | Saint-Jalmes | B64D 11/0604 244/118.6 |
| 2009/0050740 A1* | 2/2009 | Saint-Jalmes | B64D 11/0601 244/118.6 |
| 2009/0066121 A1* | 3/2009 | Jacob | B64D 11/0604 297/118 |
| 2011/0101161 A1* | 5/2011 | Saint-Jalmes | B64D 11/06 244/118.6 |
| 2012/0112500 A1* | 5/2012 | Rundle | B64D 11/00 297/147 |
| 2012/0146372 A1* | 6/2012 | Ferry | B64D 11/06 297/232 |
| 2012/0206867 A1* | 8/2012 | Pence | F16M 13/00 361/679.01 |
| 2012/0223557 A1* | 9/2012 | Henshaw | B64D 11/0641 297/232 |
| 2012/0298798 A1* | 11/2012 | Henshaw | B60N 2/34 244/118.6 |
| 2012/0318918 A1* | 12/2012 | Johnson | B64D 11/06 244/118.6 |
| 2013/0106156 A1* | 5/2013 | Orson | B64D 11/064 297/217.3 |
| 2013/0248653 A1* | 9/2013 | Round | B64D 11/0641 244/118.6 |
| 2013/0248654 A1* | 9/2013 | Henshaw | B64D 11/06 244/118.6 |
| 2013/0248655 A1* | 9/2013 | Kroll | B64D 11/0606 244/118.6 |
| 2014/0035330 A1* | 2/2014 | Henshaw | B64D 11/0606 297/174 R |
| 2014/0283296 A1* | 9/2014 | Jerome | B64D 11/0646 5/12.1 |
| 2014/0306500 A1* | 10/2014 | Dryburgh | B64D 11/06 297/232 |
| 2014/0361585 A1* | 12/2014 | Henshaw | B64D 11/0606 297/174 R |
| 2015/0001341 A1* | 1/2015 | Ersan | B64D 11/0601 244/118.6 |
| 2015/0166183 A1* | 6/2015 | Henshaw | B64D 11/0641 244/118.6 |
| 2015/0210393 A1* | 7/2015 | Savian | B64D 11/0015 244/118.6 |
| 2015/0329208 A1* | 11/2015 | Eakins | G06F 30/15 297/232 |
| 2016/0016667 A1* | 1/2016 | Schmidt-Schaffer | B64D 11/0643 244/118.6 |
| 2016/0052633 A1* | 2/2016 | Lawson | B64D 11/00 244/118.6 |
| 2016/0122022 A1* | 5/2016 | Cooke | B64D 11/0605 244/118.6 |
| 2016/0297529 A1* | 10/2016 | Cailleteau | B64D 11/0601 |
| 2016/0297530 A1* | 10/2016 | Simeon | B64D 11/0606 |
| 2017/0029118 A1* | 2/2017 | Ehrmann | B64D 11/064 |
| 2017/0088267 A1* | 3/2017 | Dowty | B64D 11/06 |
| 2017/0240283 A1* | 8/2017 | Dowty | B64D 11/0606 |
| 2017/0259921 A1* | 9/2017 | Valdes De La Garza | B64D 11/0641 |
| 2017/0327232 A1* | 11/2017 | Morgan | B64D 11/0604 |
| 2018/0022458 A1* | 1/2018 | Weifenbach | B64D 11/0601 244/118.6 |
| 2018/0194473 A1* | 7/2018 | Emrich | B64D 25/04 |
| 2018/0281959 A1* | 10/2018 | Braca | B64D 11/0604 |
| 2019/0248497 A1* | 8/2019 | Ersan | B64D 11/0604 |
| 2020/0108934 A1* | 4/2020 | Williamson | B64D 11/0627 |

FOREIGN PATENT DOCUMENTS

| | | |
|---|---|---|
| EP | 3378770 B1 | 3/2020 |
| WO | 2010018367 A2 | 7/2010 |
| WO | 2010018367 A3 | 7/2010 |

* cited by examiner

BUSINESS CLASS TRAVEL SUITE ARRANGEMENTS FOR NARROW BODY AND WIDE BODY AIRCRAFT

BACKGROUND

Optimizing aircraft passenger accommodations includes maximizing seating density while attending to passenger comfort. Generally, the more spacious and comfortable a seat the fewer the number of seats that can be provided.

Seat rows are typically spaced apart from one another so that legroom is provided between rows. Longitudinal aisles may be provided that divide the seats into sections. For example, the seating arrangement may include a single longitudinal aisle that divides the seating arrangement into two side sections. In other arrangements, two aisles may divide the seating arrangement into a center section and two side sections to provide improved ingress and egress to the rows and access to emergency exits.

Airlines typically charge higher fares for upgraded or premium seating. For example; a premium seat may be wider; recline farther; and be arranged to provide more legroom than a standard seat. Some aircraft are divided into different class cabins, with each class having a different seating arrangement. For example, an aircraft may have a higher fare business class cabin near the front of the aircraft and a lower fare coach or economy class cabin near the rear of the aircraft.

In recent years, seats have been developed that are convertible between an upright sitting position for taxi, take-off and landing (TTOL) and a lie-flat sleeping position in-flight to allow the seat to be used as a bed. These seats have proven popular on long haul and international flights during which a passenger may desire to sleep aboard the aircraft. While such lie-flat seating provides additional comforts to passengers, lie-flat seating requires additional space and seat pitch, making it difficult to provide such seat types in large quantities. For example, when seats are oriented at an angle with respect to a longitudinal axis of an aircraft, a typical lie-flat seating arrangement has a seat pitch approximately double that found in economy class, and some arrangements require the seats to overlap laterally. Non-angled lie-flat seating typically requires an even greater seat pitch than angled and will often rely on an alternative arrangement of longitudinally-overlapping seats to facilitate efficient utilization of space in the aircraft.

Attempts have been made to provide fully reclining, lie-flat, or sleeper seat seating arrangements that efficiently utilize, limited aircraft cabin space, Some arrangements have attempted to angle the seats equally in a horizontal plane, while others have attempted to overlap portions of the seats vertically, and still others have provided back-to-back seating with vertical overlap to exploit generally unused space to expand in a vertical direction.

While the above arrangements offer some advantages, they remain plagued by drawbacks and disadvantages. For example, in some arrangements overlapping seats causes seat spaces to feel confining and small, and arrangements designed to conserve space can require one passenger to access their space by passing through the seat space of another passenger. Not only is this inconvenient for both passengers, it may lead to difficulties during an emergency. Raised seating arrangements also generally cause greater loads to be applied to the floor; and thus require heavier and more substantial and expensive support structures to satisfy airline safety requirements.

Accordingly, what is needed are seating arrangements that better optimize density, spatial efficiency, comfort and privacy for both narrow body and wide body aircraft.

BRIEF SUMMARY

To achieve the foregoing and other advantages, the inventive aspects disclosed herein are directed to a travel suite arrangement for an aircraft cabin including a longitudinal aisle and a four-suite unit positioned adjacent the longitudinal aisle. The four-suite unit includes a first suite including a first seat, the first suite positioned directly adjacent the longitudinal aisle and the first seat positioned forward-facing and angled with respect to the longitudinal aisle, a second suite including a second seat, the second suite positioned directly adjacent the longitudinal aisle and the second seat positioned rearward-facing and angled with respect to the longitudinal aisle, a third suite including a third seat, the third suite positioned apart from the longitudinal aisle and to one side of the first suite, and the third seat positioned rearward-facing and angled with respect to the longitudinal aisle, and a fourth suite including a fourth seat, the fourth suite positioned apart from the longitudinal aisle and to one side of the second suite, and the fourth seat positioned forward-facing and angled with respect to the longitudinal aisle.

In some embodiments, the first seat may be angled toward the longitudinal aisle, the second seat may be angled away from the longitudinal aisle, the third seat may be angled toward the longitudinal aisle, and the fourth seat may be angled away from the longitudinal aisle.

In some embodiments, the first and second seats may face each other, and the third and fourth seats may be positioned back-to-back.

In some embodiments, the angle of the first seat may be less than the angle of the second seat, and the angle of the fourth seat may be less than the angle of the third seat.

In some embodiments, the angle of the first seat may be equal to and opposite the angle of the fourth seat, and the angle of the second seat may be equal to and opposite the angle of the third seat.

In some embodiments, the angle of the first and fourth seats may be less than 10 degrees, and the angle of the second and third seats may be greater than 10 degrees.

In some embodiments, each of the first and second suites may be accessed directly from the longitudinal aisle, the third suite may be accessed through a passageway positioned behind the first suite, and the fourth suite may be accessed through a passageway positioned behind the second suite.

In some embodiments, the four-suite unit may further include a privacy divider dividing the first and second suites.

In some embodiments, the four-suite unit may further include a first ottoman serving the first seat positioned with the privacy divider and a second ottoman serving the second seat positioned with the privacy divider, wherein the first and second ottomans are positioned side-by-side.

In some embodiments, the four-suite unit may further include a privacy divider positioned between the first and the third suites and a privacy divider positioned between the second and the fourth suites, wherein each of the privacy dividers includes a retractable portion.

The inventive aspects disclosed herein are further directed to a travel suite arrangement for an aircraft cabin including a longitudinal aisle dividing the aircraft cabin into a first section and a second section, each of the first and second sections including a plurality of longitudinally-aligned four-suite units. Each of the plurality of four-suite units includes a first suite including a first seat, the first suite positioned directly adjacent the longitudinal aisle and the first seat positioned forward-facing and angled with respect to the longitudinal aisle, a second suite including a second seat, the second suite positioned directly adjacent the longitudinal aisle and the second seat positioned rearward-facing and angled with respect to the longitudinal aisle, a third suite including a third seat, the third suite positioned apart from the longitudinal aisle and to one side of the first suite, and the third seat positioned rearward-facing and angled with respect to the longitudinal aisle, and a fourth suite including a fourth seat, the fourth suite positioned apart from the longitudinal aisle and to one side of the second suite, and the fourth seat positioned forward-facing and angled with respect to the longitudinal aisle.

In some embodiments, the plurality of four-suite units in the first section may be a mirror image of the plurality of four-suite units in the second section about an axis bisecting the longitudinal aisle.

In some embodiments, the first seat may be angled toward the longitudinal aisle, the second seat may be angled away from the longitudinal aisle, the third seat may be angled toward the longitudinal aisle, and the fourth seat may be angled away from the longitudinal aisle.

In some embodiments, each of the four-suite units may include a first privacy divider dividing the first and second suites, a second privacy divider dividing the first and third suites, and a third privacy divider dividing the second and fourth suites, wherein at least the second and third privacy dividers each include a retractable portion.

In some embodiments, the four-suite unit may further include a fourth privacy divider positioned between each third suite of one four-suite unit and each fourth suite of a longitudinally-adjacent four-suite unit.

The inventive aspects disclosed herein are further directed to a travel suite arrangement for positioning in an aircraft cabin including a first suite including a first seat, the first suite positionable directly adjacent a longitudinal aisle and the first seat positionable forward-facing and angled with respect to the longitudinal aisle, a second suite including a second seat, the second suite positionable directly adjacent the longitudinal aisle and the second seat positionable rearward-facing and angled with respect to the longitudinal aisle, a third suite including a third seat, the third suite positionable apart from the longitudinal aisle and to one side of the first suite, and the third seat positionable rearward-facing and angled with respect to the longitudinal aisle, and a fourth suite including a fourth seat, the fourth suite positionable apart from the longitudinal aisle and to one side of the second suite, and the fourth seat positionable forward-facing and angled with respect to the longitudinal aisle.

Embodiments of the invention can include one or more or any combination of the above features and configurations.

BRIEF DESCRIPTION OF THE DRAWINGS

Features, aspects and advantages of the present invention are better understood when the following detailed description of the invention is read with reference to the accompanying drawings, in which.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Layouts of passenger accommodations including individual travel suites for narrow body and wide body aircraft are described below with reference to the drawings. The various layouts provide density and spatial efficiency improvements as compared to traditional seat layouts. Spatial efficiency is gained, in part, through the utilization of shared passageways for accessing outboard suites positioned along the fuselage wall or non-aisle center seats. Spatial efficiency is further gained, in part, by arranging the suites and/or their respective seats in an angled arrangement based on a four-suite unit including two forward-facing seats and two aft-facing seats, which can be tessellated along the cabin. The layouts disclosed herein optimize density while maintaining living space for the passengers.

In some embodiments, aisle-side forward-facing and aft-facing seats are arranged at a slight angle with respect to the longitudinal aircraft axis. For example, one seat may have its longitudinal seat axis oriented at approximately 17 degrees from the longitudinal aircraft axis while the opposing facing seat may have its longitudinal seat axis oriented at approximately 7 degrees from the longitudinal aircraft axis, allowing the ottomans of the seats to be positioned together. This allows the two facing seats to be condensed along the axis of the fuselage providing linear space for the outboard (or center non-aisle seat positions in wide body aircraft) access passageways. The outboard seats are also angled at the same relative angles opposite the aisle angled seats.

Figure 1:
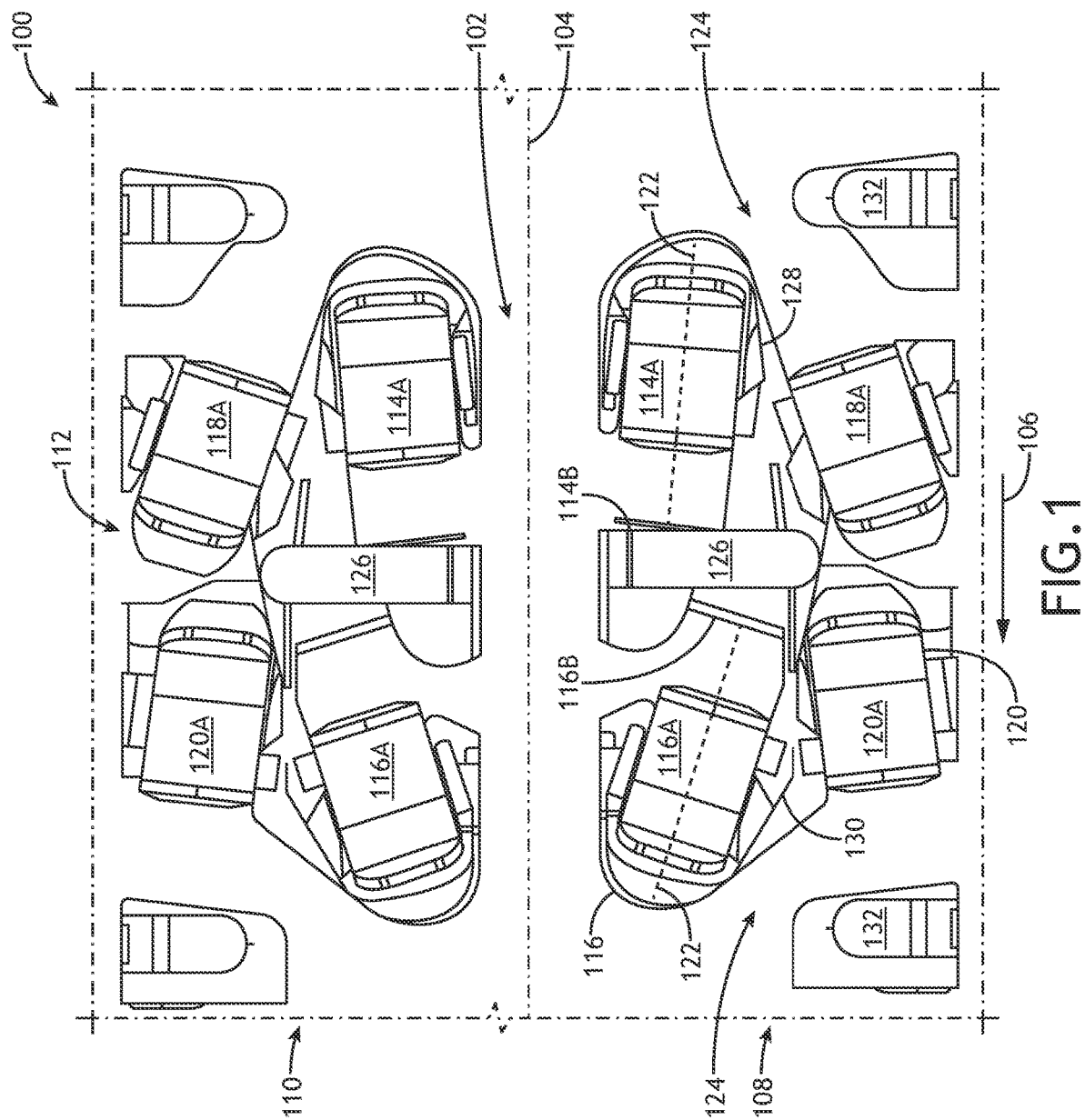
FIG. 1 is a plan view of part of a travel suite arrangement for a narrow body aircraft according to the present disclosure.

FIG. 1 illustrates a first travel suite cabin layout shown generally at reference numeral 100. The layout may be part of, for example, a business class cabin for a narrow body aircraft. The cabin is divided into two sections by a longitudinal aisle 102 oriented parallel to the aircraft axis 104. The direction of forward travel is indicated at directional arrow 106; however, it is intended and understood that aircraft forward travel may be in the opposite direction, and that the indicated direction of forward travel is provided for reference only with respect to the various suite and seat numbering and positions for clarity of this disclosure. Each of the first section 108 and the second section 110 includes a single four-suite unit 112. The four-suite units may be arranged as mirror images of one another about the aircraft axis 104 or may be laterally-misaligned.

Each four-suite unit 112 is positioned laterally-adjacent the longitudinal aisle 102, providing direct or indirect access to each suite. Each four-suite unit 112 generally includes a first suite 114 including a first seat 114A, a second suite 116 including a second seat 116A, a third suite 118 including a third seat 118A, and a fourth suite 120 including a fourth seat 120A. Each four-suite unit 112 can accommodate four traveling passengers, each in their own dedicated suite and seat space.

The first suite 114 is positioned directly adjacent the longitudinal aisle 102, with the first seat 114A positioned forward-facing and angled with respect to the longitudinal aisle. The second suite 116 is also positioned directly adjacent the longitudinal aisle 102, with the second seat 116A positioned rearward-facing and angled with respect to the longitudinal aisle. The third suite 118 is positioned apart from the longitudinal aisle 102 and to one side of the first suite 114, and with the third seat 118A positioned rearward-facing and angled with respect to the longitudinal aisle. The fourth suite 120 is also positioned apart from the longitudinal aisle 102 and to one side of the second suite 116, and with the fourth seat 120A positioned forward-facing and angled with respect to the longitudinal aisle. The third and fourth suites 118 and 120 may be positioned along the fuselage wall, in a center section, or elsewhere not directly adjacent to or accessible from a longitudinal aisle.

The first seat 114A is angled toward the longitudinal aisle 102. The second seat 116A is angled away from the longitudinal aisle 102. The third seat 118A is angled toward the longitudinal aisle 102. The fourth seat 120A is angled away from the longitudinal aisle 102. The first and second seats 114A, 116A are positioned facing each other. As shown, the first seat 114A faces substantially forward and the second seat 116A faces substantially rearward, or vice versa, depending on the direction of forward travel. The third and fourth seats 118A, 120A are positioned back-to-back and face in opposite directions. As shown, the third seat 118A faces substantially rearward and the fourth seat 120A faces substantially forward. Thus, in each four-suite unit 112, two of the seats are forward-facing and two of the seats are rearward of aft-facing.

The angle of the first seat 114A, with each seat angle measured as the longitudinal seat axis 122 with respect to the aircraft axis 104, is less than the angle of the second seat 116A, and the angle of the fourth seat 120A is less than the angle of the third seat 118A. In some embodiments, the angle of the first seat 114A is equal to but opposite the angle of the fourth seat 120A, and the angle of the second seat 116A is equal to but opposite the angle of the third seat 118A. In this arrangement, the first seat 114A and the fourth seat 120A face in the same general direction and are positioned at the same seat angle, with the first seat 114A angled toward the longitudinal aisle 102 and the second seat 116A angled away from that same longitudinal aisle, and the second seat 116A and the third seat 118A face in the same general direction and are positioned at the same seat angle, with the second seat 116A angled away from that same longitudinal aisle and the third seat 118A angled toward that same longitudinal aisle. This arrangement positions each longitudinal suite axis and/or longitudinal seat axis 122 at an angle (i.e., not parallel) with respect to the aircraft axis 104.

In some embodiments, the angle of the first and the fourth seats 114A, 120A is less than the angle of the second and third seats 116A, 118A. In some embodiments, the angle of the first and fourth seats 114A, 120A is 10 degrees or less, more preferably less than 10 degrees, and even more preferably 7 degrees. In some embodiments, the angle of the second and third seats 116A, 118A is 10 degrees or more, more preferably more than 10 degrees, and even more preferably 17 degrees. Other seat angles and angular relationships are intended and envisioned.

Positioning and angling the four suites 114, 116, 118, 120 as such improves seating density and spatial efficiency, among other advantages. With the aisle-side fore and aft-facing seats 114A, 116A arranged at a slight angle, with one seat arranged at a greater angle than the opposite facing seat, the ottomans 114B, 116B serving the respective first and second seats 114A, 116A, can be positioned together, for example, side-by-side. This allows the two seats 114A, 116A facing each other to be condensed along the axis of the fuselage, which in turn provides linear space for access passageways behind the two suites 114, 116 to the two outboard suites 118, 120, or center non-aisle seat positions in twin aisle aircraft. The outboard seats 118A, 120A are also angled at the same relative angles opposite the aisle-angled seats 114A, 116A.

Positioning each four-suite unit 112 adjacent a longitudinal aisle 102 allows direct access from the longitudinal aisle to the first and second suites 114, 116 without having to pass through the seat space of another, thus respecting each traveling passenger's comfort and privacy. By angling the aisle-side suites 114, 116 and positioning the respective ottomans 114B, 116B side-by-side, space is provided behind each of the first and second suites 114, 116 for access passageways for accessing the respective third and fourth suites 118, 120. In a cabin layout including only one four-suite unit along the cabin length, the third suite 118 is accessed through a dedicated access passageway 124 positioned behind the first suite 114, and the fourth suite 120 is accessed through a different dedicated access passageway 124 positioned behind the second suite 116. Thus, the passengers of the respective third and fourth suites 118, 120 of each four-seat unit 112 access their respective suites through separate access passageways.

As discussed in detail below, in cabin layouts including more than one four-suite unit 112 along the cabin length, a dedicated access passageway is provided behind the second suite 116 for accessing the fourth suite 120 from the longitudinal aisle 102 at the front of the cabin, while access passageways downstream of the front formed between the back of the first suite 114 of one four-suite unit 112 and the back of the second suite 116 of the longitudinally-adjacent four-suite unit 112 are shared to access the respective third suite 118 of the one four-suite unit 112 and the fourth suite 120 of the longitudinally-adjacent four-suite unit 112.

Each four-suite unit 112 includes a first privacy divider 126 dividing the first and second suites 114, 116, a second privacy divider 128 dividing the first and third suites 114, 118, and a third privacy divider 130 dividing the second and fourth suites 116, 120. Additional privacy dividers 132 are provided forward of each of the third and fourth seats 118A, 120A. For example, a dedicated privacy divider 132 may be positioned forward of the forwardmost fourth seat 120A in the cabin, while a shared privacy divider 132 may be positioned dividing the third suite 118 of one four-suite unit 112 and the fourth suite 120 of the longitudinally-adjacent four-suite unit 112.

As discussed below, privacy dividers may be separate structures or part of suites walls and may serve as mounting locations for video monitors, storage cabinets, table mounts, seat controls, power/data ports, footwells, ottomans, etc. As shown in FIG. 1, the ottomans 114B, 1166 serving the respective first and second seats 114A, 116A are located with the first privacy divider 126. Each privacy divider may have a tall height to enhance privacy between adjacent suites and aisles, and may have a door that opens and closes, at least in the case of the aisle-side suites 114, 116.

Figure 2:
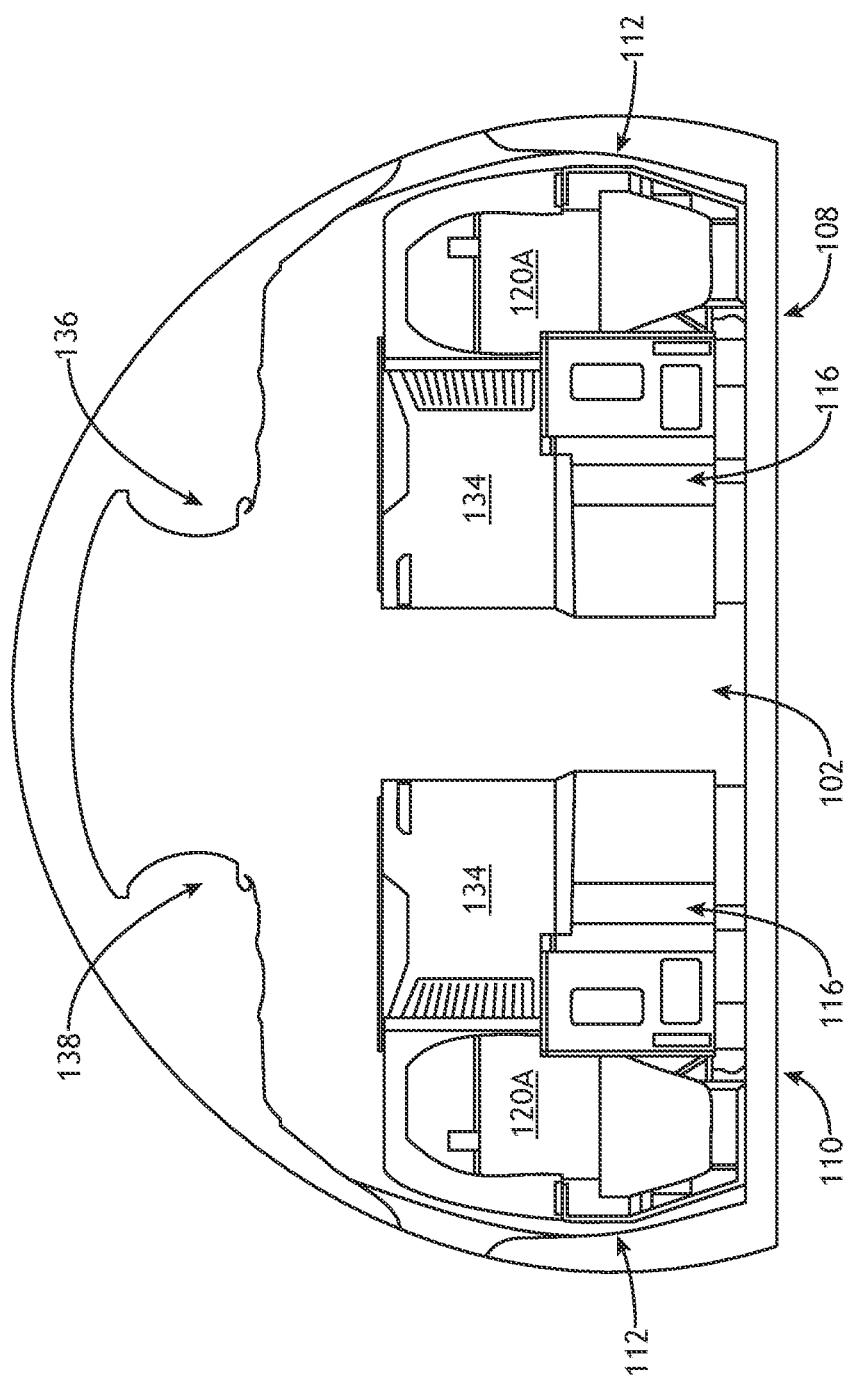
FIG. 2 is a corresponding end view of the travel suite arrangement of FIG. 1.

FIG. 2 illustrates an end view of the cabin layout of FIG. 1 from the perspective of the front of the cabin to the rear, showing the fourth seats 120A angled outward away from the longitudinal aisle 102. As shown, the fourth seats 120A are angled toward the fuselage wall and windows. The backs of the second suites 116, for example, the backs of the suite-defining walls or shells 134 are visible inboard of the fourth seats 120A. First and second overhead stowage bin sections 136, 138 are positioned over the respective first and second cabin sections 108, 110 to serve the passengers in the respective four-suite units 112 immediately below the corresponding bins.

Figure 3:
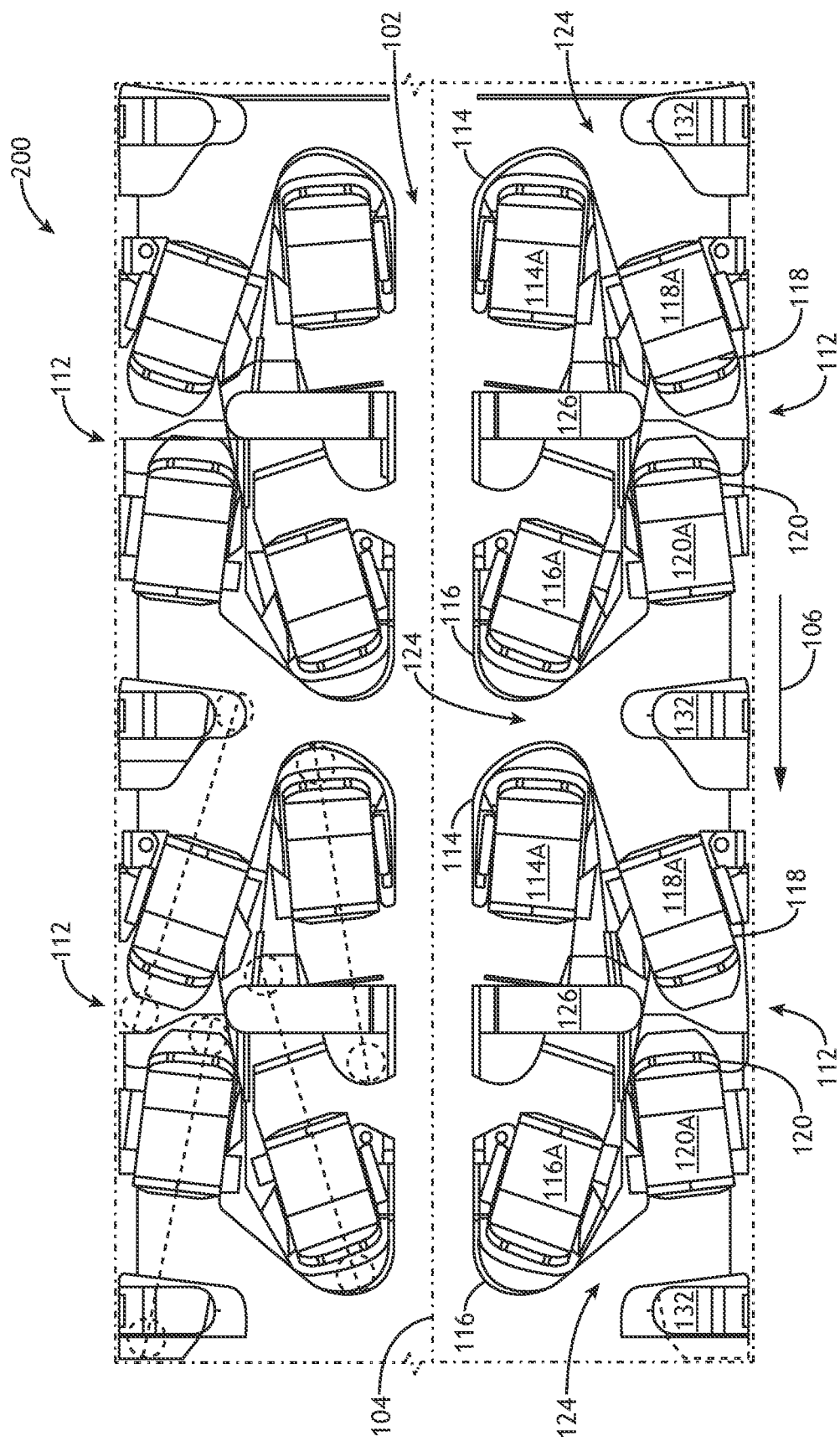
FIG. 3 is a plan view showing the travel suite arrangement of FIG. 1 repeated along the longitudinal length of the aircraft cabin.

FIG. 3 illustrates a second travel suite cabin layout shown generally at reference numeral 200. Like the first layout 100, the second layout 200 may be part of, for example, a business class cabin for a narrow body aircraft. The cabin is divided into two sections by a longitudinal aisle 102 oriented parallel to the aircraft axis 104. In a non-limiting example, the direction of forward travel is indicated at directional arrow 106. Each first and second section 108, 110 includes two or more like four-suite units 112. Each four-suite unit 112 is substantially a mirror image of the four-suite unit 112 directly across the aisle 102. The suite and seat positions, angles and arrangements, as well as at least some of the privacy dividers, are the same as described above with reference to FIG. 1 and the first cabin layout 100.

A dedicated access passageway 124 is provided behind the second suite 116 for accessing the fourth suite 120 from the longitudinal aisle 102 at the front of the cabin, while access passageways downstream of the front formed between the back of the first suite 114 of one four-suite unit 112 and the back of the second suite 116 of the longitudinally-adjacent four-suite unit 112 are shared to access the respective third suite 118 of the one four-suite unit 112 and the fourth suite 120 of the longitudinally-adjacent four-suite unit 112. Privacy dividers 132 are provided forward of each of the third and fourth seats 118A, 120A. For example, a dedicated privacy divider 132 may be positioned forward of the forwardmost fourth seat 120A in the cabin, while a shared privacy divider 132 may be positioned dividing the third suite 118 of one four-suite unit 112 and the fourth suite 120 of the longitudinally-adjacent four-suite unit 112.

Figure 4:
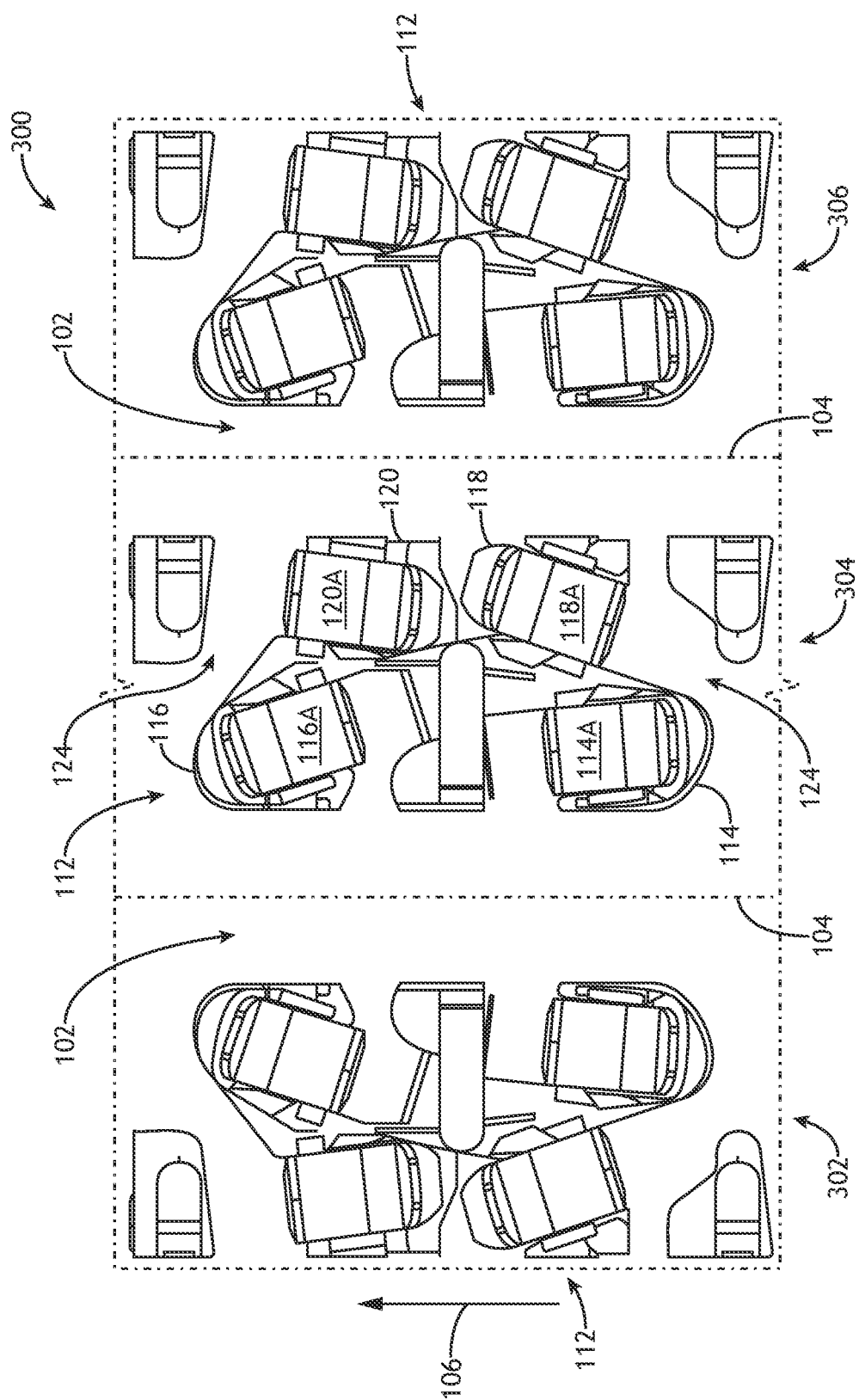
FIG. 4 is a plan view of part of a travel suite arrangement for a wide body aircraft according to the present disclosure.

FIG. 4 illustrates a third travel suite cabin layout shown generally at reference numeral 300. The cabin layout 300 may be part of, for example, a business class cabin for a wide body aircraft. Unlike the first and second layouts 100, 200, the third cabin is divided into three substantially equal-width sections by first and second spaced-apart longitudinal aisles 102 oriented parallel to the aircraft axis 104. In a non-limiting example, the direction of forward travel is indicated at directional arrow 106. The three sections include a left-side or port section 302, a center section 304, and a right-side or starboard section 306. Each section 302, 304, 306 includes at least one four-suite unit 112. The four-suite unit 112 in the left-side section 302 is a mirror image of the four-suite unit 112 in the center section 304 about the centerline bisecting the left-side longitudinal aisle 102. The four-suite unit 112 in the right-side section 306 has the same orientation as the four-suite unit 112 in the center section 304; however, it should be understood that the four-suite unit 112 in the right-side section 306 could have the same orientation as the four-suite unit 112 in the left-side section 302, or a different orientation all together.

In the cabin layout shown, the outboard suites adjacent the fuselage walls are accessed through dedicated or shared access passageways as described above, while the suites in the center section 304 may be accessed directly from their laterally-adjacent aisle, or the third and fourth suites 118, 120 and/or third and fourth seats 118A, 120A accessed from the left-side aisle 102 through the dedicated or shared access passageways 124. In some layouts, it may be desired to provide center section third and fourth suite access from both aisles. In other layouts, it may be desired to provide center section third and fourth suite access from only one aisle.

Figure 5:
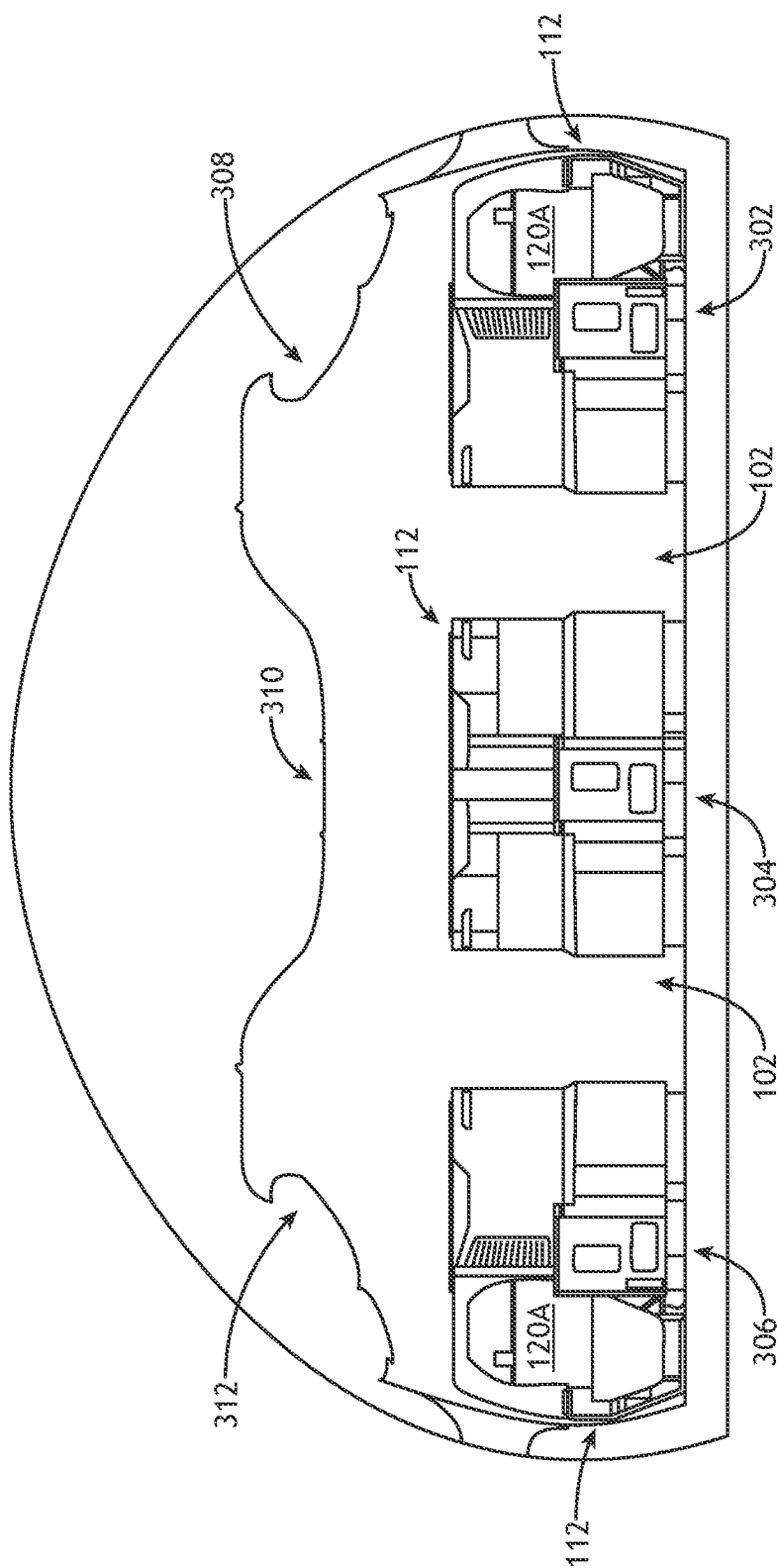
FIG. 5 is a corresponding end view of the travel suite arrangement of FIG. 4.

FIG. 5 illustrates an end view of the cabin layout of FIG. 4 from the perspective of the front of the cabin to the rear, showing the fourth seats 120A angled outward away from their respective longitudinal aisle 102. As shown, the fourth seats 120A in the left-side and right-side sections are angled toward the fuselage wall and windows, while the fourth seat of the center section 304 is concealed from view behind its respective privacy divider. First, second and third overhead stowage bin sections 308, 310, 312 are positioned over the respective left, center and right cabin sections 302, 304, 306 and serve the passengers in the respective four-suite units 112 positioned immediately below their corresponding bins.

Figure 6:
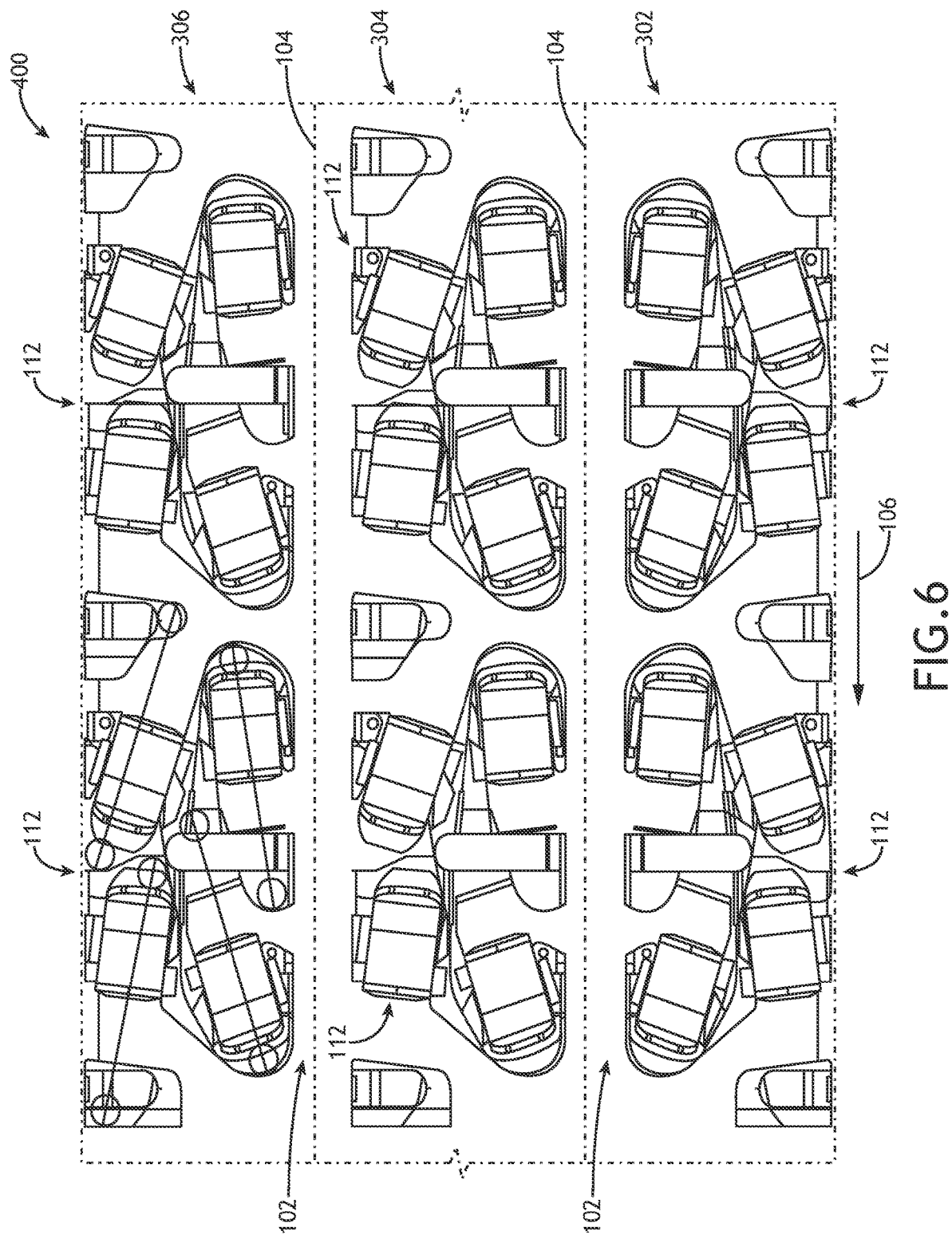
FIG. 6 is a plan view showing the travel suite arrangement of FIG. 4 repeated along the longitudinal length of the aircraft cabin.

FIG. 6 illustrates a fourth travel suite cabin layout shown generally at reference numeral 400. The cabin layout 400 may be part of, for example, a business class cabin for a wide body aircraft and is essentially the layout shown in FIG. 4 including two or more like four-suite units 112 in each of the left-side, center and right-side sections. The suite and seat positions, angles and arrangements, as well as at least some of the privacy dividers, are the same as described above with reference to FIG. 4 and the third cabin layout 300.

Figure 7:
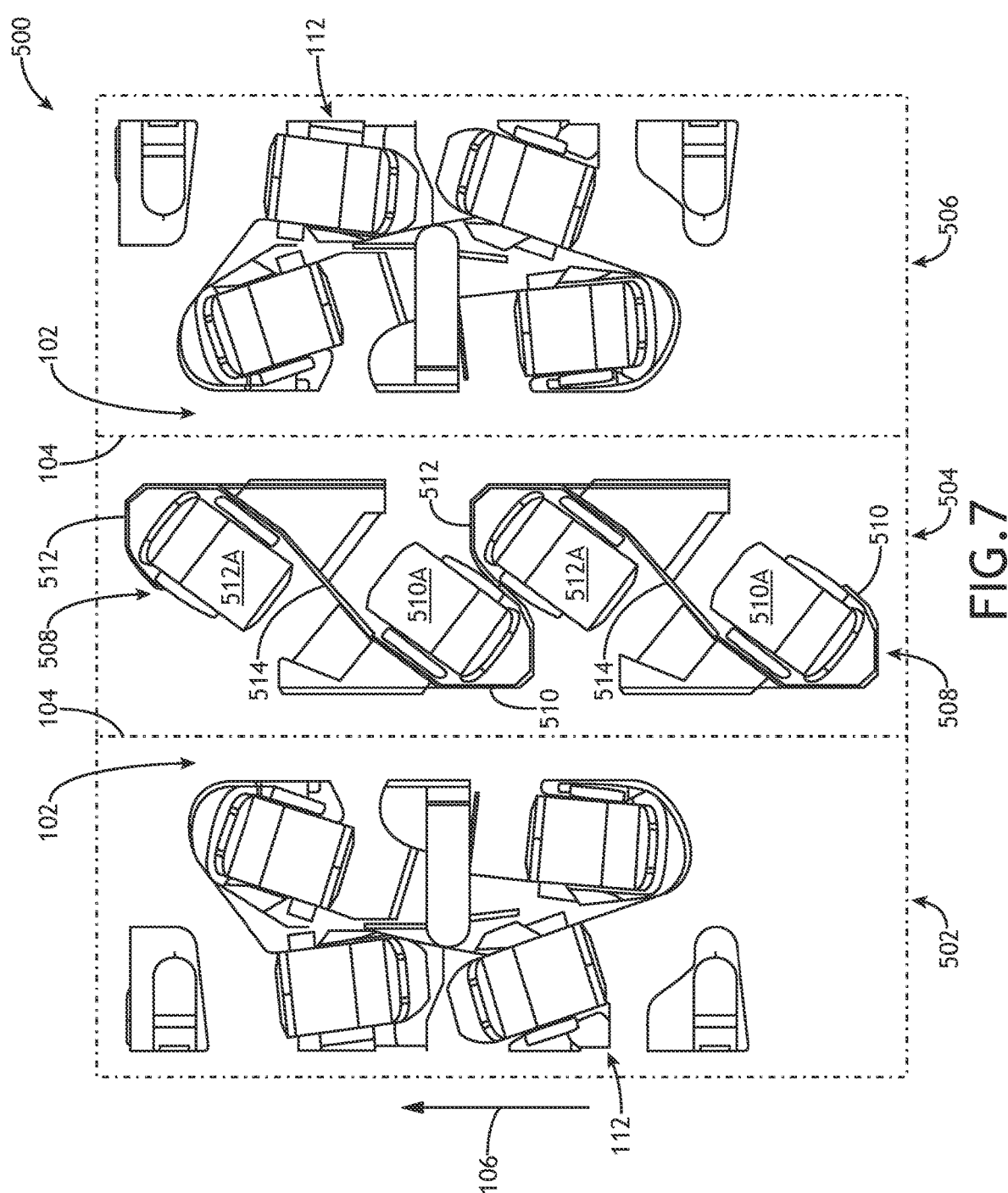
FIG. 7 is a plan view of part of yet another travel suite arrangement for a wide body aircraft according to the present disclosure.

FIG. 7 illustrates a fifth travel suite cabin layout shown generally at reference numeral 500. The cabin layout 500 may be part of, for example, a business class cabin for a wide body aircraft. The fifth cabin layout is divided into three substantially equal-width sections by first and second spaced-apart longitudinal aisles 102 oriented parallel to the aircraft axis 104. In a non-limiting example, the direction of forward travel is indicated at directional arrow 106. The three sections include a left-side or port section 502, a center section 504, and a right-side or starboard section 506. Each of the left-side and right-side sections 502, 506 includes at least one four-suite unit 112 as discussed herein in detail. The four-suite unit 112 in the left-side section 502 is a mirror image of the four-suite unit 112 in the right-side section 506 about a centerline bisecting the center section 504. The two-suite unit 508 in the center section 504 has a unique layout and a narrower width as compared to the four-suite units 112.

As shown, the two-suite unit 508 in the center section 504 includes seats angled greater than the maximum seat angle in the four-suite unit 112. Two or more suite units are longitudinally aligned in the center section 504. Each individual two-suite unit 508 includes a first suite 510 and a second suite 512 including respective first and second seats 510A, 510B. One seat 510A is positioned forward-facing and angled toward the right-side longitudinal aisle 102, and the other seat 512A is positioned rearward-facing and angled toward the left-side longitudinal aisle 102. In some embodiments, the seat angles are equal and opposite such that the seats face in opposing directions. A privacy divider 514 divides each unit pair, and aisle access is direct from the facing longitudinal aisle.

Figure 8:
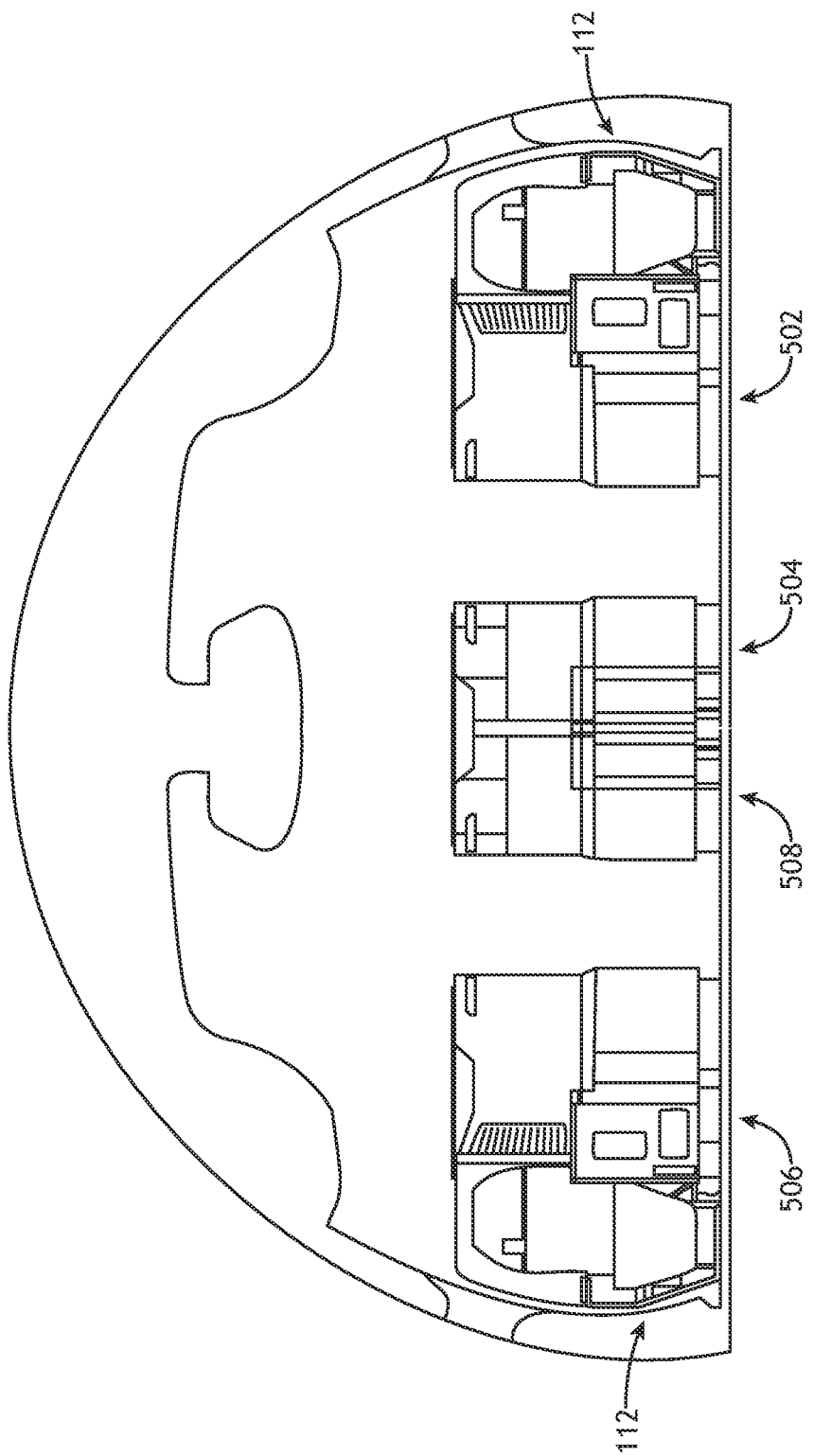
FIG. 8 is a corresponding end view of the travel suite arrangement of FIG. 7.

FIG. 8 illustrates an end view of the cabin layout of FIG. 7 from the perspective of the front of the cabin to the rear, showing the four-suite units 112 in the left and right-side sections 502, 506, and the two-suite unit 508 in the center section 504.

Figure 9:
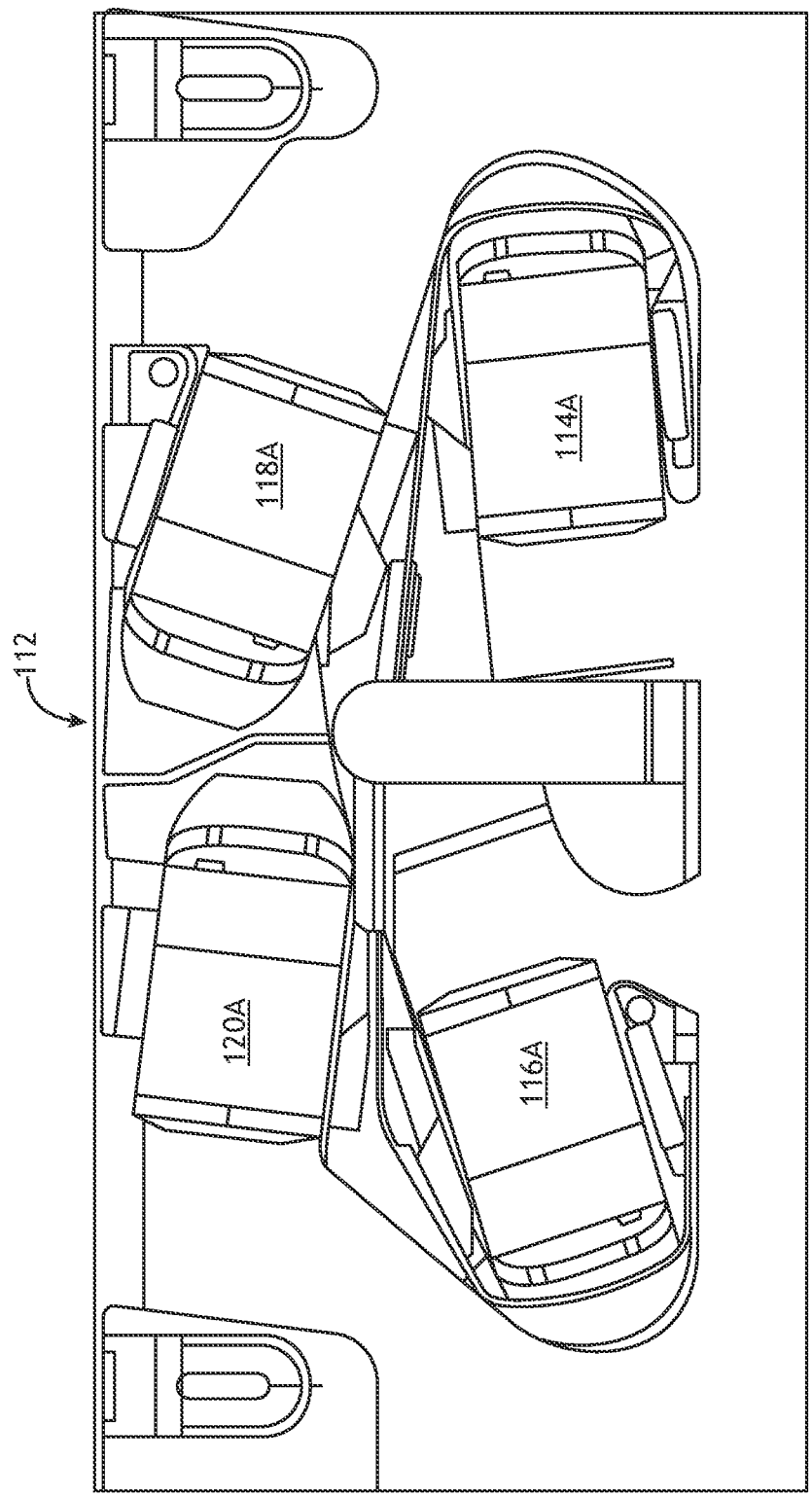
FIG. 9 is a plan view of a four-suite unit including two forward-facing seats and two aft-facing seats.
Figure 10:
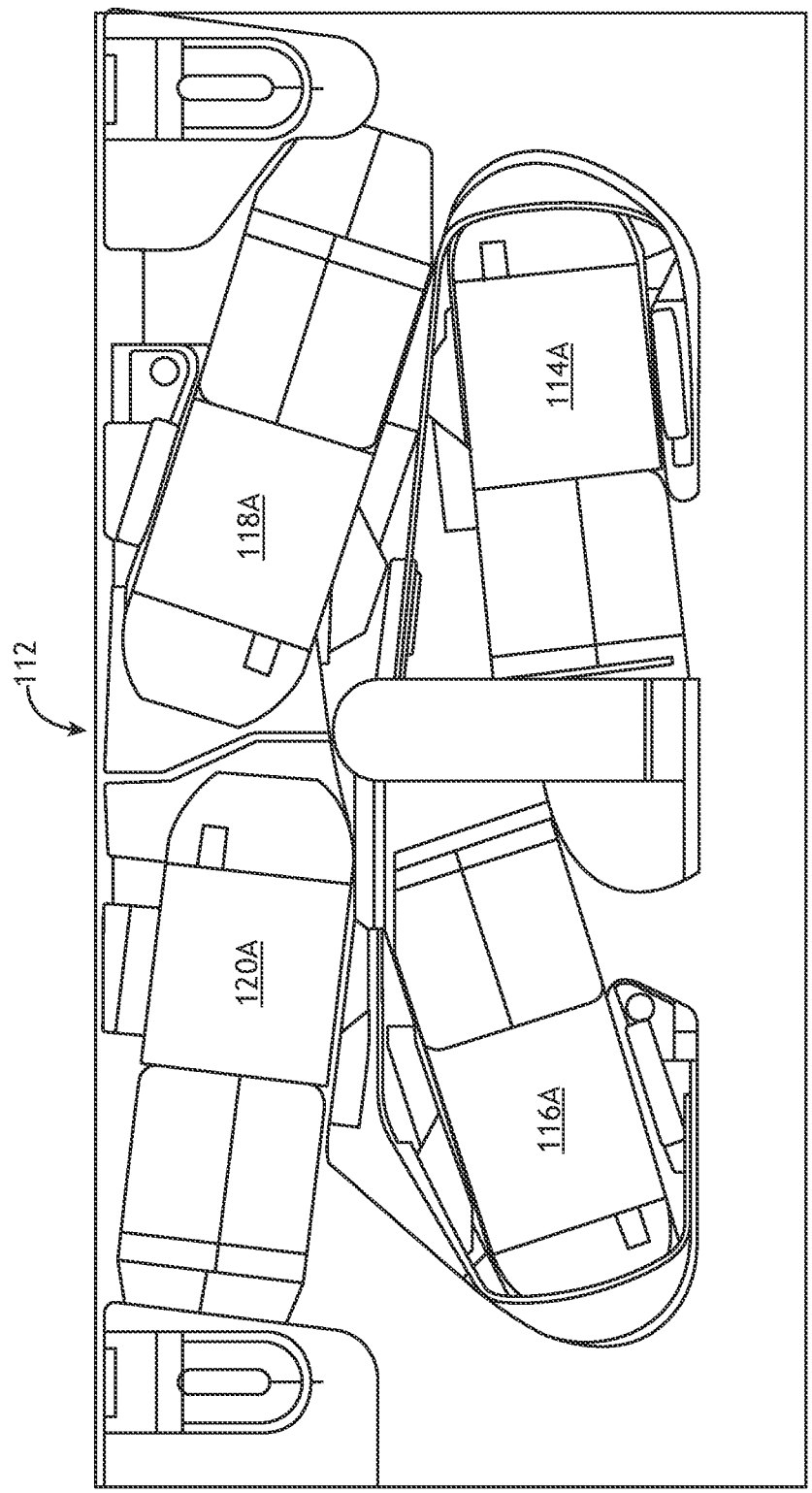
FIG. 10 is a plan view of the four-suite unit of FIG. 9 showing the seats converted to lie-flat.
Figure 11:
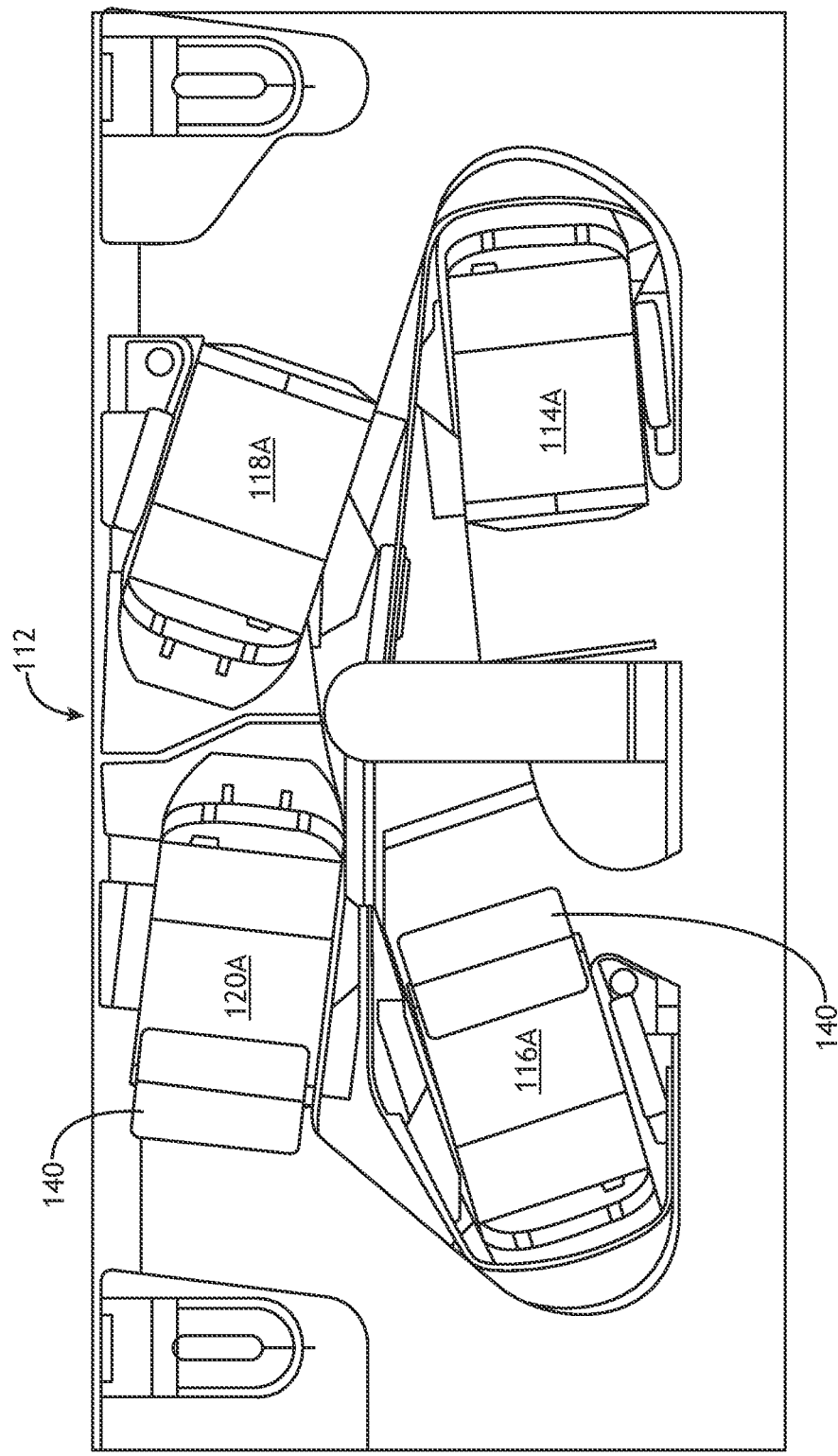
FIG. 11 is a plan view of the four-suite unit of FIG. 9 showing tray table locations and certain ones of the tray table deployed.
Figure 12:
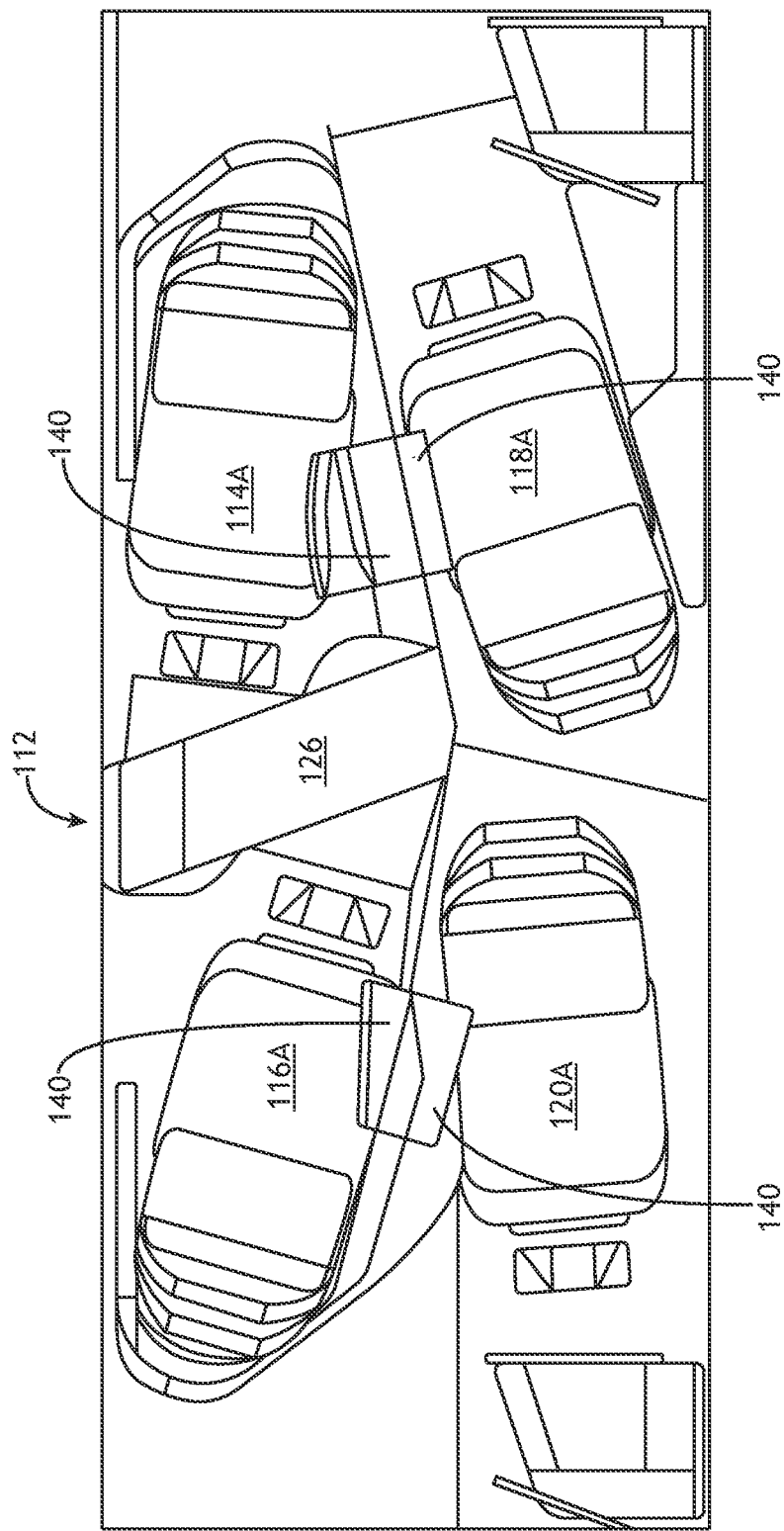
FIG. 12 is a plan view of a four-suite unit showing tray table locations and respective deployment directions.

FIG. 9 illustrates a four-suite unit 112 showing each of the seats 114A, 116A, 118A, 120A in their upright sitting position for TTOL. FIG. 10 illustrates a similar four-suite unit 112 as shown in FIG. 9 showing each of the seats 114A, 116A, 118A, 120A converted to lie-flat for in-flight sleeping. FIG. 11 illustrates a similar four-suite unit 112 as shown in FIG. 9 showing each of the seats 114A, 116A, 118A, 120A in the upright sitting position and with the tray tables 140 serving the second and fourth seats 116A, 120A deployed and unfolded for use. FIG. 12 illustrates a similar four-suite unit 112 as shown in FIG. 9, but with a slightly different layout and first privacy divider 126 configuration. Whereas the first privacy divider 126 shown in FIG. 1 is substantially perpendicular to the aircraft axis, the first privacy divider shown in FIG. 12 is angled with respect to the aircraft axis. FIG. 12 further shows possible stowage positions of the tray tables 140 tray table deployment directions to serve each of the four seats 114A, 116A, 118A, 120A.

Figure 13:
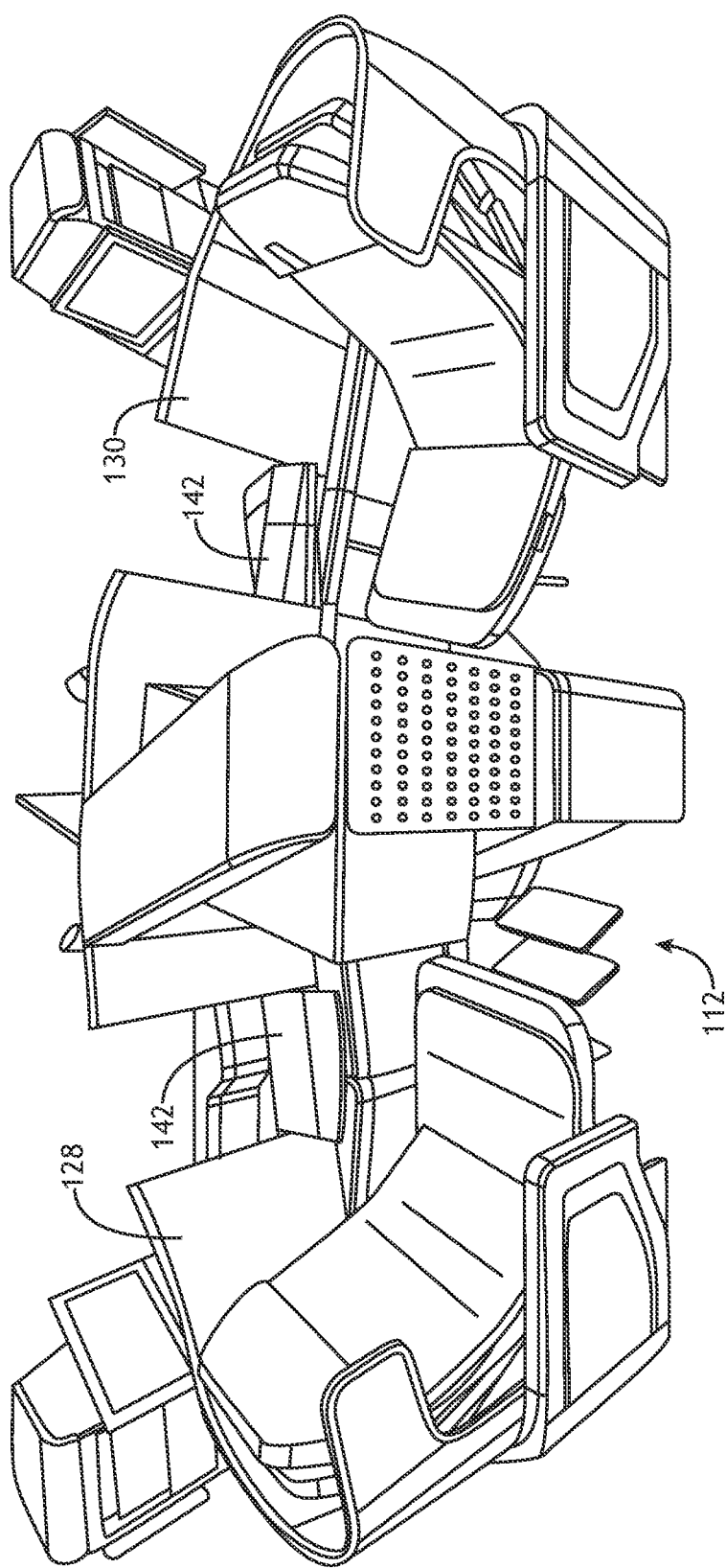
FIG. 13 is an aisle-side perspective view of a four-suite unit.
Figure 14:
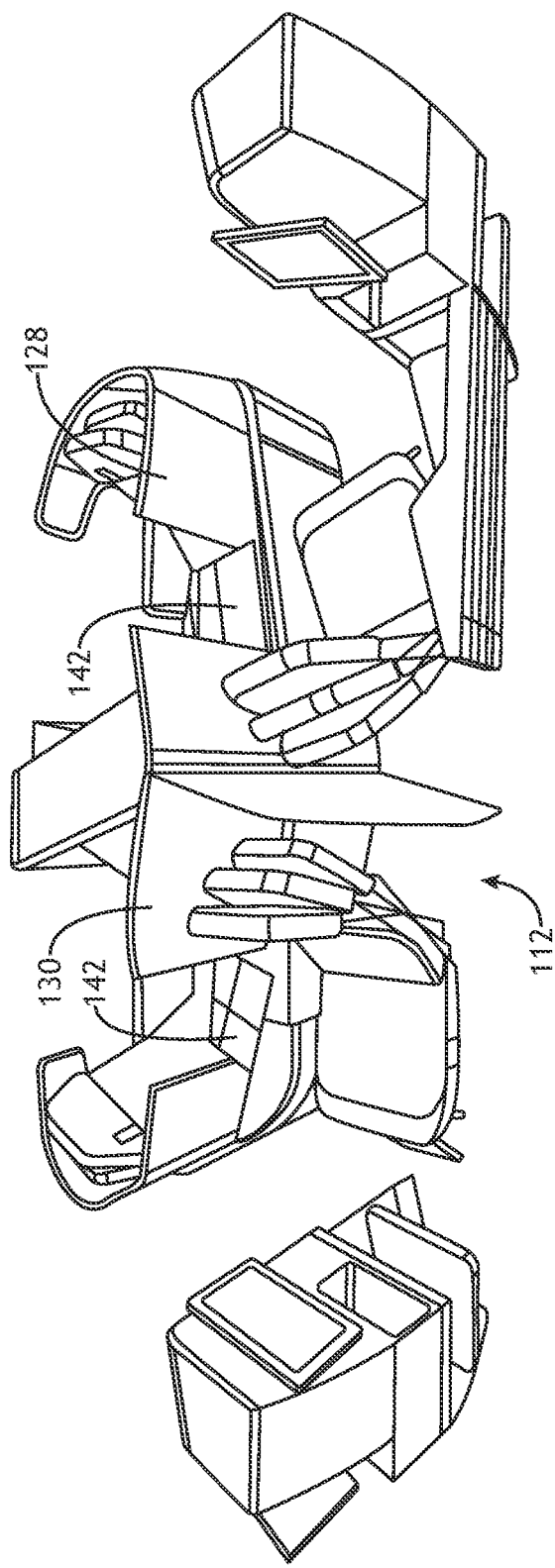
FIG. 14 is a fuselage-side perspective view of the four-suite unit of FIG. 13.

FIGS. 13 and 14 show respective aisle-side and fuselage-side views of one design for the four-suite unit 112 including privacy shell configurations, and the second and third privacy dividers 128, 130 each including a retractable portion 142 that may be stowed to relax the privacy or deployed to enhance the privacy between the laterally-adjacent suites.

The foregoing description provides embodiments of the invention by way of example only. It is envisioned that other embodiments may perform similar functions and/or achieve similar results. Any and all such equivalent embodiments and examples are within the scope of the present invention and are intended to be covered by the claims.

What is claimed is:

1. A travel suite arrangement for an aircraft cabin, comprising:
 a longitudinal aisle defining a longitudinal aisle axis; and
 a four-suite unit positioned to one side of and adjacent the longitudinal aisle, comprising:
  a first suite including a first seat, the first suite positioned directly adjacent the longitudinal aisle and the first seat positioned forward-facing and angled toward the longitudinal aisle;
  a second suite including a second seat, the second suite positioned directly adjacent the longitudinal aisle and the second seat positioned rearward-facing and angled away from the longitudinal aisle;
  a third suite including a third seat, the third suite positioned apart from the longitudinal aisle and to one side of the first suite, and the third seat positioned rearward-facing and angled toward the longitudinal aisle; and
  a fourth suite including a fourth seat, the fourth suite positioned apart from the longitudinal aisle and to one side of the second suite, and the fourth seat positioned forward-facing and angled away from the longitudinal aisle;
  wherein the angle of each of the first, second, third and fourth seats is measured as a respective longitudinal seat axis with respect to the longitudinal aisle axis; and
  wherein the angle of the first seat is less than the angle of the second seat, and the angle of the fourth seat is less than the angle of the third seat.

2. The travel suite arrangement of claim 1, wherein the first and second seats face each other, and the third and fourth seats are positioned back-to-back.

3. The travel suite arrangement of claim 1, wherein the angle of the first seat is equal to and opposite the angle of the fourth seat, and the angle of the second seat is equal to and opposite the angle of the third seat.

4. The travel suite arrangement of claim 3, wherein the angle of the first and fourth seats is less than 10 degrees, and the angle of the second and third seats is greater than 10 degrees.

5. The travel suite arrangement of claim 1, wherein each of the first and second suites are accessed directly from the longitudinal aisle, the third suite is accessed through a passageway positioned behind the first suite, and the fourth suite is accessed through a passageway positioned behind the second suite.

6. The travel suite arrangement of claim 1, wherein the four-suite unit further comprises a privacy divider dividing the first and second suites, the privacy divider extending from the longitudinal aisle to a position behind the third seat.

7. The travel suite arrangement of claim 6, wherein the four-suite unit further comprises a first ottoman serving the first seat positioned with the privacy divider and a second ottoman serving the second seat positioned with the privacy divider, wherein the first and second ottomans are positioned side-by-side.

8. The travel suite arrangement of claim 1, wherein the four-suite unit further comprises a privacy divider positioned between the first and the third suites and a privacy divider positioned between the second and the fourth suites, wherein each of the privacy dividers includes a retractable portion.

9. A travel suite arrangement for an aircraft cabin, comprising:
 a longitudinal aisle defining a longitudinal aisle axis and dividing the aircraft cabin into a first section and a second section, each of the first and second sections including a plurality of longitudinally-aligned four-suite units, wherein each of the plurality of four-suite units comprises:
  a first suite including a first seat, the first suite positioned directly adjacent the longitudinal aisle and the first seat positioned forward-facing and angled toward the longitudinal aisle;
  a second suite including a second seat, the second suite positioned directly adjacent the longitudinal aisle and the second seat positioned rearward-facing and angled away from the longitudinal aisle;

a third suite including a third seat, the third suite positioned apart from the longitudinal aisle and to one side of the first suite, and the third seat positioned rearward-facing and angled toward the longitudinal aisle; and a fourth suite including a fourth seat, the fourth suite positioned apart from the longitudinal aisle and to one side of the second suite, and the fourth seat positioned forward-facing and angled away from the longitudinal aisle;

wherein the angle of each of the first, second, third and fourth seats is measured as a respective longitudinal seat axis with respect to the longitudinal aisle axis; and wherein the angle of the first seat is less than the angle of the second seat, and the angle of the fourth seat is less than the angle of the third seat.

10. The travel suite arrangement of claim 9, wherein the plurality of four-suite units in the first section are a mirror image of the plurality of four-suite units in the second section about the longitudinal aisle axis bisecting the longitudinal aisle.

11. The travel suite arrangement of claim 9, wherein the first and second seats face each other and the third and fourth seats are positioned back-to-back.

12. The travel suite arrangement of claim 9, wherein the angle of the first seat is equal to and opposite the angle of the fourth seat, and the angle of the second seat is equal to and opposite the angle of the third seat.

13. The travel suite arrangement of claim 12, wherein the angle of the first and the fourth seats is less than 10 degrees, and the angle of the second and the third seats is greater than 10 degrees.

14. The travel suite arrangement of claim 9, wherein each of the first and the second suites are accessed directly from the longitudinal aisle, and the third and the fourth suites are accessed through shared passageways.

15. The travel suite arrangement of claim 9, wherein each of the four-suite units further comprises a first privacy divider dividing the first and second suites and extending from the longitudinal aisle to a position behind the third seat, a second privacy divider dividing the first and third suites, and a third privacy divider dividing the second and fourth suites, wherein at least the second and third privacy dividers each include a retractable portion.

16. The travel suite arrangement of claim 15, further comprising a fourth privacy divider positioned between each third suite of one four-suite unit and each fourth suite of a longitudinally-adjacent four-suite unit.

* * * * *